(12) United States Patent
Moriwaki et al.

(10) Patent No.: US 10,045,424 B2
(45) Date of Patent: Aug. 7, 2018

(54) LIGHTING CONTROL SYSTEM

(71) Applicant: Panasonic Intellectual Property Management Co., Ltd., Osaka (JP)

(72) Inventors: Toshiya Moriwaki, Osaka (JP); Tatsumi Setomoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/492,713

(22) Filed: Apr. 20, 2017

(65) Prior Publication Data

US 2017/0311413 A1    Oct. 26, 2017

(30) Foreign Application Priority Data

Apr. 21, 2016  (JP) ................. 2016-085607

(51) Int. Cl.
*H05B 37/02* (2006.01)
*G06F 3/147* (2006.01)
*G06T 7/73* (2017.01)

(52) U.S. Cl.
CPC ......... *H05B 37/0227* (2013.01); *G06F 3/147* (2013.01); *G06T 7/74* (2017.01); *H05B 37/0272* (2013.01)

(58) Field of Classification Search
CPC ....... G06F 3/147; G06T 7/74; H05B 37/0227; H05B 37/0272

See application file for complete search history.

(56) References Cited

U.S. PATENT DOCUMENTS

| | | | |
|---|---|---|---|
| 8,796,951 B2* | 8/2014 | Feri ................. | H05B 37/029 315/295 |
| 9,504,114 B2* | 11/2016 | Moriwaki ......... | H05B 33/0854 |
| 2011/0260654 A1* | 10/2011 | Tanigawa .......... | H05B 37/0227 315/313 |

(Continued)

FOREIGN PATENT DOCUMENTS

| JP | 2010-033765 A | 2/2010 |
|---|---|---|
| JP | 2012-069423 A | 4/2012 |

(Continued)

*Primary Examiner* — Alexander H Taningco
*Assistant Examiner* — Kurtis R Bahr
(74) *Attorney, Agent, or Firm* — McDermott Will & Emery LLP

(57) ABSTRACT

A lighting control system includes: lighting apparatuses; a controller; an image sensor capturing an image of an irradiation surface irradiated by the lighting apparatuses; and a display. The controller includes: a calculator which performs calculation of a position of one of the lighting apparatuses, on a basis of a luminance level in an image obtained by capturing the image of the irradiation surface by the image sensor in a state in which only the one of the lighting apparatuses is turned on or off; an associator which, every time the calculator performs the calculation of a position of one of the lighting apparatuses which is turned on or off, associates the identification information item set in advance to the one of the lighting apparatuses, with a position information item indicating the position of the one of the lighting apparatuses; and a generator that generates a map.

10 Claims, 16 Drawing Sheets

(56) References Cited

U.S. PATENT DOCUMENTS

| | | | |
|---|---|---|---|
| 2014/0070707 A1* | 3/2014 | Nagazoe | H04B 10/116 315/151 |
| 2014/0333766 A1* | 11/2014 | Enohara | H05B 37/029 348/143 |
| 2015/0198938 A1* | 7/2015 | Steele | G05B 15/02 700/275 |
| 2016/0105645 A1* | 4/2016 | Yamazaki | H04N 7/181 348/159 |
| 2016/0205749 A1* | 7/2016 | Creusen | H05B 37/0218 315/151 |
| 2016/0342190 A1 | 11/2016 | Enohara et al. | |

FOREIGN PATENT DOCUMENTS

| | | |
|---|---|---|
| JP | 5062618 B2 | 10/2012 |
| JP | 2013-156853 A | 8/2013 |
| JP | 2014-056670 A | 3/2014 |
| JP | 2015-002083 A | 1/2015 |

* cited by examiner

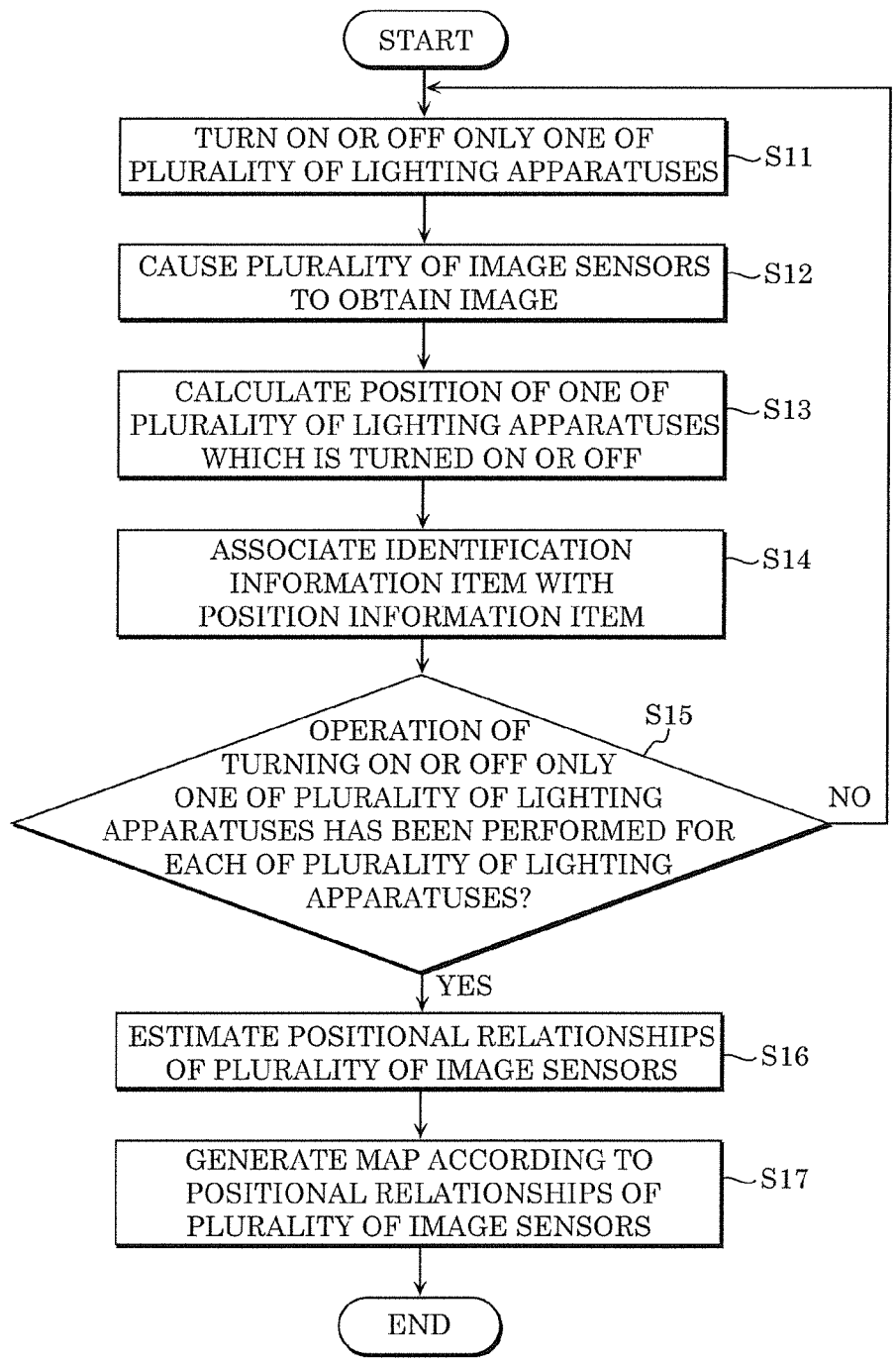

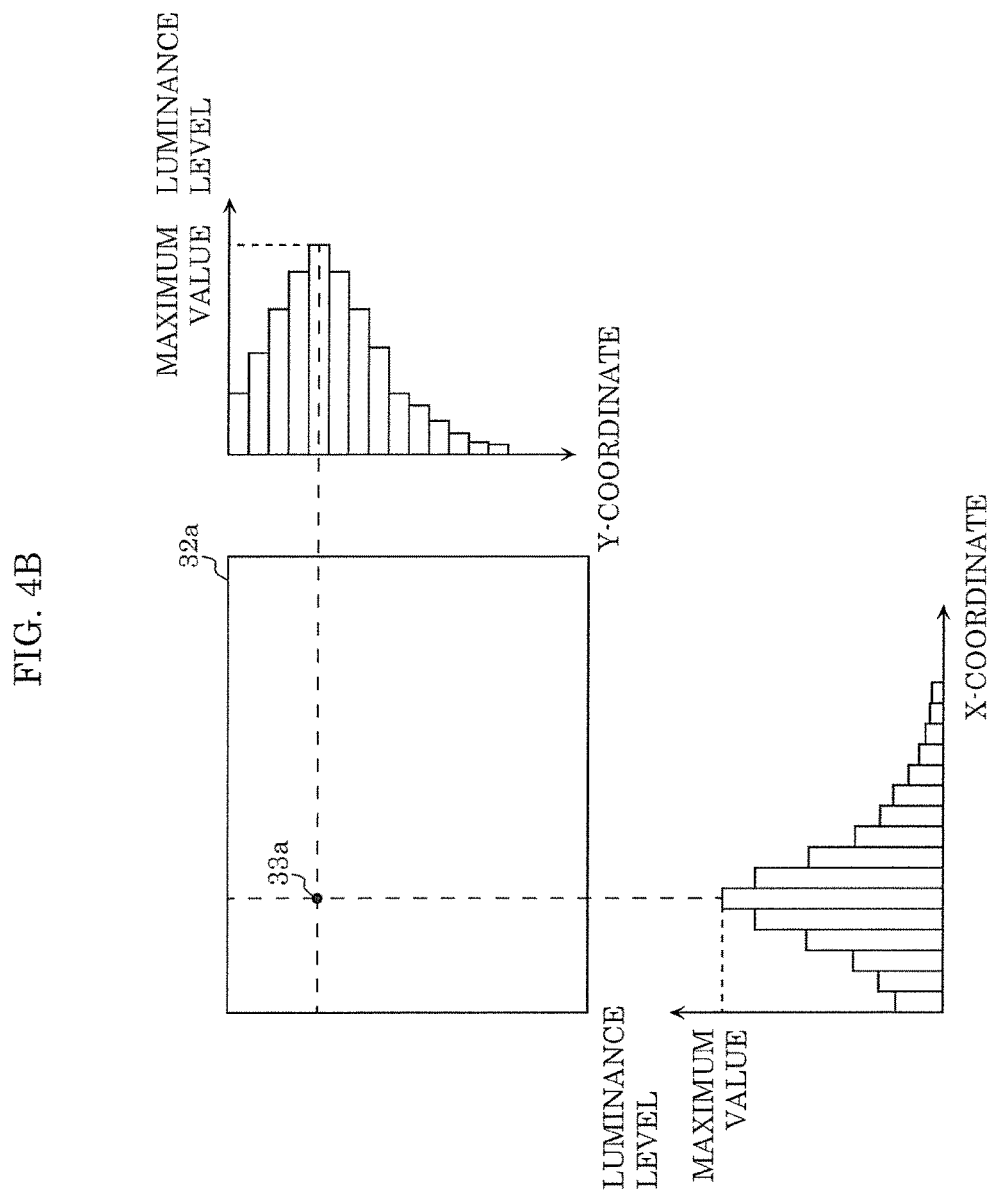

| IDENTIFICATION INFORMATION | POSITION INFORMATION |
|---|---|
| #5 | $X_1, Y_1$ |
| #8 | $X_2, Y_2$ |
| #11 | $X_3, Y_3$ |
| #10 | $X_4, Y_4$ |

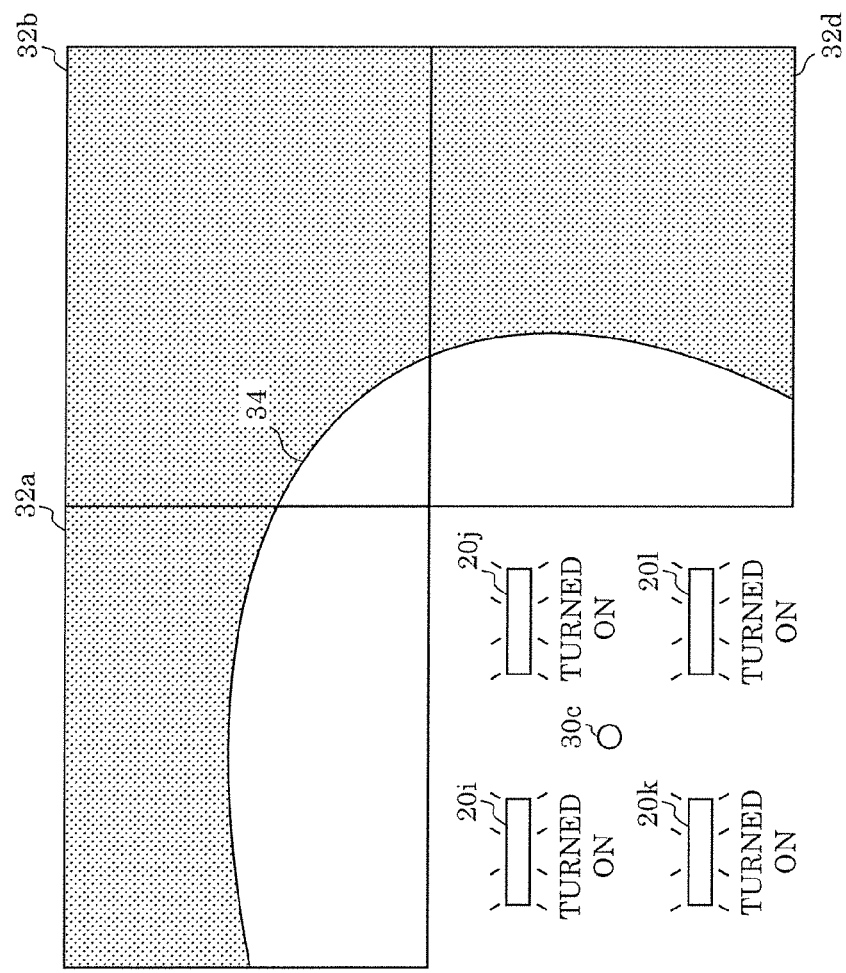

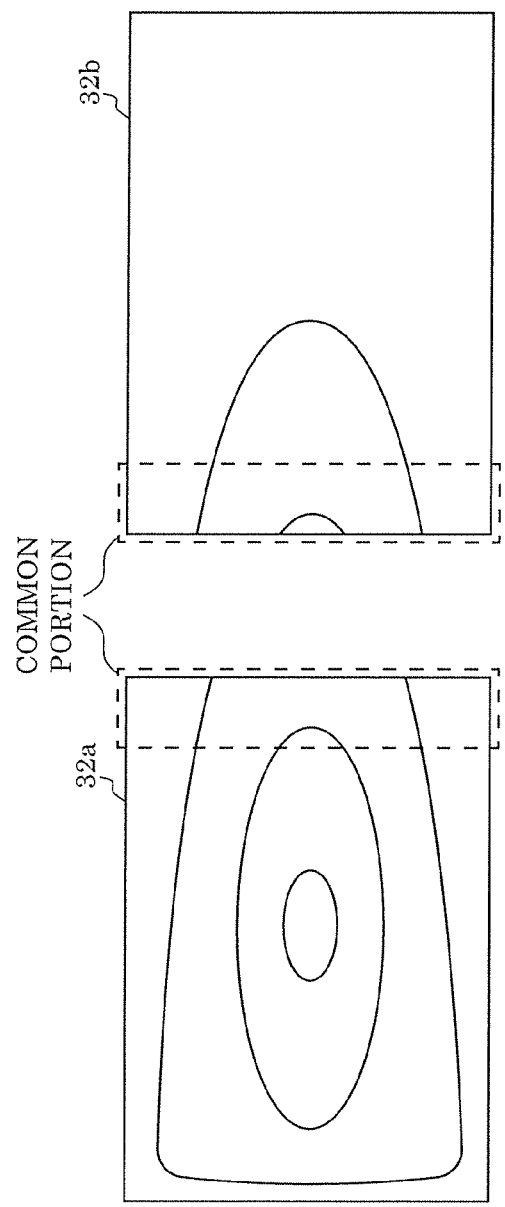

AVERAGE X-COORDINATE    AVERAGE X-COORDINATE

SAME X-COORDINATE    SAME X-COORDINATE

LIGHTING CONTROL SYSTEM

CROSS REFERENCE TO RELATED APPLICATION

This application claims the benefit of priority of Japanese Patent Application Number 2016-085607 filed on Apr. 21, 2016, the entire content of which is hereby incorporated by reference.

BACKGROUND

1. Technical Field

The present disclosure relates to a lighting control system.

2. Description of the Related Art

A large number of lighting apparatuses are installed on a ceiling in a wide space such as an office, business premises, a warehouse, a factory, etc. A lighting control system in which each of such lighting apparatuses is provided with a radio communicator, and turning on or off, dimming, color-adjusting, etc., of each of the lighting apparatuses are performed by carrying out an operation using a map which indicates a position of each of the lighting apparatuses and is displayed on a terminal device such as a smartphone, a tablet terminal, a remote controller, or the like which communicates with each of the lighting apparatuses, has been attracting lots of attention in recent years. In the map, identification information items (communication addresses, for example) respectively set in advance to the lighting apparatuses are associated one-to-one with, for example, a plurality of icons arranged on the map, according to the positions of the lighting apparatuses which are actually installed. In this manner, it is possible to control an intended lighting apparatus by performing an operation on the icon on the map displayed by the terminal device.

Conventionally, various techniques for generating a map in a lighting control system including a plurality of lighting apparatuses are proposed (for example, Japanese Unexamined Patent Application Publication No. 2014-56670).

In the conventional lighting control systems including Japanese Unexamined Patent Application Publication No. 2014-56670, generation of a map is representatively carried out according to the procedure describe below. In the following procedure, it is assumed that a plurality of lighting apparatuses and a terminal device are wirelessly connected. First, according to an instruction issued by an operator, the terminal device obtains an identification information item that is set in advance to each of the plurality of lighting apparatuses, by broadcasting the instruction toward the plurality of lighting apparatuses, for example, and stores the obtained identification information item. At this time, the terminal device generates an icon to which the identification information item obtained by the terminal device is associated. Next, the operator operates the terminal device to select one identification information item (icon) from among the identification information items of the plurality of lighting apparatuses which have been obtained. Then, the terminal device transmits a control command for blinking to a lighting apparatus corresponding to the selected identification information item. As a result, the lighting apparatus which has received the control command brinks, for example. The operator visually confirms a position of the lighting apparatus that is blinking, and drags the identification information item (icon) which has been selected, to a position, on an image screen of the terminal device, which corresponds to a position of the lighting apparatus that has blinked. The above-described operation is repeated for each of the plurality of lighting apparatuses, thereby generating a map in which a plurality of icons associated one-to-one with identification information items are arranged according to the positions of lighting apparatuses which are actually installed.

SUMMARY

However, with the above-described technique of generating a map, an operator cannot estimate which of a plurality of lighting apparatuses will blink when one identification information item is selected from among identification information items of the plurality of lighting apparatuses, and thus it is necessary to approach to the lighting apparatus which has actually blinked to confirm the position of the lighting apparatus. Furthermore, it is necessary to repeat such confirmation for each of the plurality of lighting apparatuses. For that reason, when a large number of the lighting apparatuses included in the lighting control system are installed in a wide space, a large amount of time is taken for generating a map, and an operation error might occur when an icon is dragged. Accordingly, it involves significantly cumbersome work.

In view of the above, an object of the present disclosure is to provide a lighting control system capable of readily generating a map used in the lighting control system.

A lighting control system according to an aspect of the present disclosure includes: a plurality of lighting apparatuses each having an identification information item that is set in advance; a controller; at least one image sensor which captures an image of an irradiation surface that is irradiated by the plurality of lighting apparatuses; and a display. In the lighting control system, the controller includes: a calculator which (i) performs calculation of a position of one of the plurality of lighting apparatuses, on a basis of a luminance level in an image obtained by capturing the image of the irradiation surface by the at least one image sensor in a state in which only the one of the plurality of lighting apparatuses is turned on or off, and (ii) obtains a position of each of the plurality of lighting apparatuses, by performing the calculation for each of the plurality of lighting apparatuses; an associator which, every time the calculator performs the calculation of a position of one of the plurality of lighting apparatuses which is turned on or off, associates the identification information item that is set in advance to the one of the plurality of lighting apparatuses, with a position information item indicating the position of the one of the plurality of lighting apparatuses; and a generator that generates a map which can be displayed by the display and in which the position information items associated with the identification information items by the associator are arranged.

With the lighting control system according to an aspect of the present disclosure, it is possible to readily generate a map used in the lighting control system.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 3 is a flowchart which illustrates an example of an operation of the lighting control system according to the embodiment;

FIG. 4B is a diagram which illustrates an example of luminance distribution of an image obtained by the image sensor according to the embodiment;

FIG. 6A is an explanation diagram for explaining an example of a method of estimating positional relationship among a plurality of image sensors;

FIG. 6C is an explanation diagram for explaining an example of a method of estimating positional relationship among the plurality of image sensors;

DETAILED DESCRIPTION OF THE EMBODIMENTS

Figure 1:
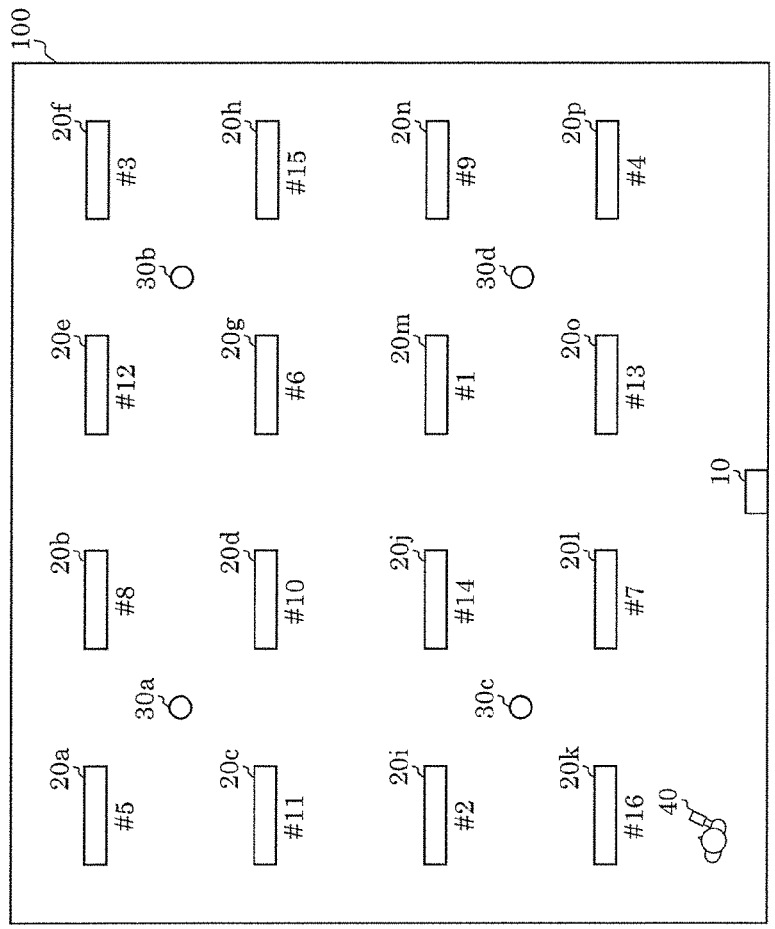
FIG. 1 is a diagram which illustrates an example of a room in which a lighting control system according to an embodiment is applied.

The following describes in detail embodiments according to the present disclosure, with reference to the drawings. It should be noted that the embodiments described below each indicates one specific example of the present disclosure. The numerical values, shapes, materials, structural elements, the arrangement and connection of the structural elements, steps, the processing order of the steps, etc. shown in the following embodiments are mere examples, and therefore do not limit the scope of the appended claims and their equivalents. Furthermore, among the structural components in the following embodiments, components not recited in the independent claim which indicates the broadest concept of the present disclosure are described as arbitrary structural components.

In addition, each diagram is a schematic diagram and not necessarily strictly illustrated. Additionally, the same structural components share the same reference numerals in each diagram.

(Embodiment)

The following describes an embodiment with reference to FIG. 1 to FIG. 9B.

(Configuration)

Figure 2:
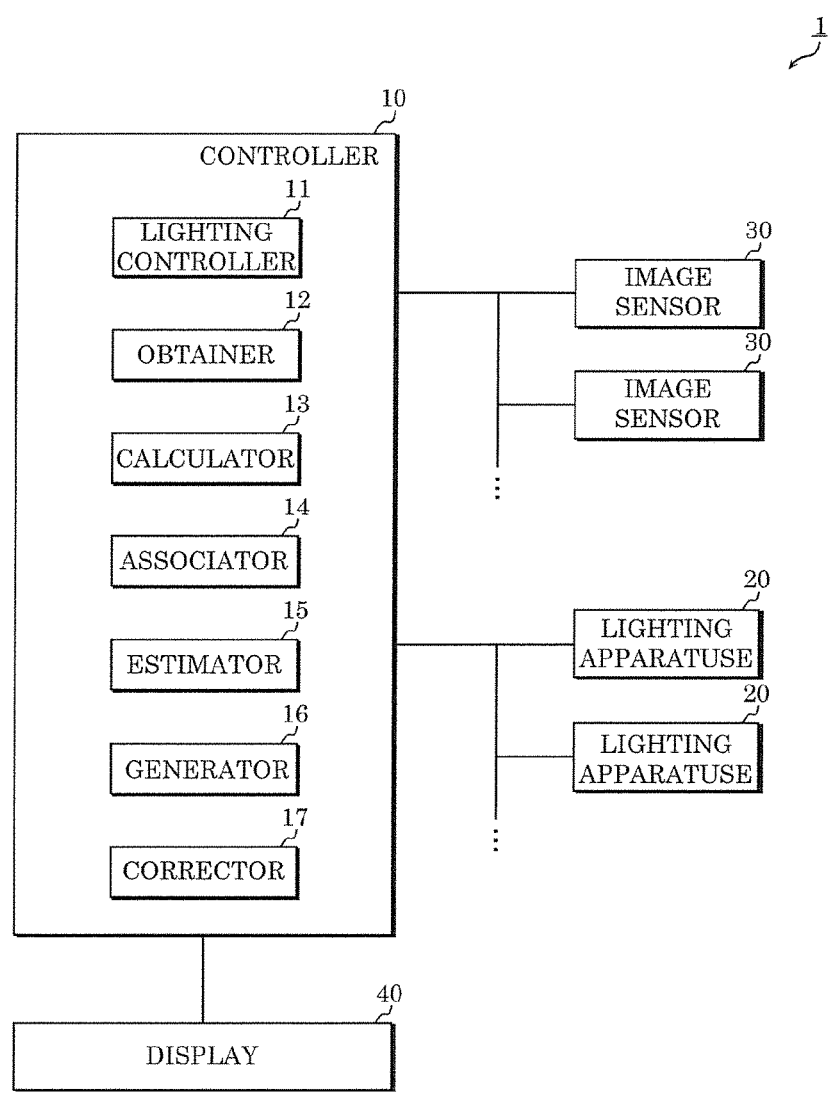
FIG. 2 is a configuration diagram which illustrates an example of a configuration of the lighting control system according to the embodiment.

First, the following describes a configuration of lighting control system 1 according to the embodiment, with reference to FIG. 1 and FIG. 2.

FIG. 1 is a diagram illustrating an example of a room in which lighting control system 1 according to the embodiment is applied. FIG. 1 is a diagram which illustrates room 100 viewed from a ceiling side. In addition, a plurality of lighting apparatuses 20 and at least one image sensor 30 which are installed on the ceiling are illustrated in FIG. 1.

FIG. 2 is a configuration diagram which illustrates an example of a configuration of lighting control system 1 according to the embodiment.

Lighting control system 1 includes a plurality of lighting apparatuses 20, controller 10, at least one image sensor 30, and display 40. According to the present embodiment, lighting control system 1 includes lighting apparatuses 20*a* to 20*p* as the plurality of lighting apparatuses 20, and image sensors 30*a* to 30*d* as the at least one image sensor 30. It should be noted that, in the description below, lighting apparatuses 20*a* to 20*p* are also collectively referred to as lighting apparatus 20, and image sensors 30*a* to 30*d* are also collectively referred to as image sensor 30.

The plurality of lighting apparatuses 20 are, for example, ceiling lights or the like, which are installed dispersedly in room 100 which is a wide room such as an office. The plurality of lighting apparatuses 20 are installed on, for example, a ceiling in room 100. In other words, an irradiation surface which is irradiated by the plurality of lighting apparatuses 20 is disposed on a floor side of room 100. In addition, identification information items are set in advance to the plurality of lighting apparatuses 20. The identification information items are identification information items each being unique to a corresponding one of the plurality of lighting apparatuses 20, and a communication address, for example, of the corresponding one of the plurality of lighting apparatuses 20. Here, numerals are used in explanation, for example, as an example of the identification information items. It should be noted that the identification information item is, in many cases, not an information item that can be visually recognized, for example, from the external view of lighting apparatus 20. Accordingly, at the time of installation of a plurality of lighting apparatuses 20, the plurality of lighting apparatuses 20 are installed in room 100 irrespective of the identification information items. In this manner, as illustrated in FIG. 1, the plurality of lighting apparatuses 20 are installed in such a manner that the respective identification information items are irregularly arranged.

The at least one image sensor 30 is a camera or the like which is installed on a ceiling of room 100. Image sensor 30 is installed in such a manner that an imaging direction is toward the floor side of room 100, and images the irradiation surface irradiated by the plurality of lighting apparatuses 20. It should be noted that image sensor 30 has, in addition to a function of obtaining an image by capturing an image of the irradiation surface, a function of at least one of a human sensor and a luminance sensor. These functions are implemented as a result of, for example, image recognition of an image obtained by image sensor 30.

Display 40 is capable of displaying a map in which a plurality of position information items (icons, for example) associated one-to-one with the identification information items are arranged according to the positions of the plurality of lighting apparatuses 20 which are actually installed. Display 40 transmits a control command to lighting apparatus 20 corresponding to the position information item, as a result of an operation (tap, click, etc., for example) on the position information item on the map displayed on an image screen. Display 40 is a terminal such as a tablet terminal, a smartphone, a remote controller, etc.

Controller 10 is a controller which, in normal use, relays the control command transmitted by display 40 to transfer the control command to the plurality of lighting apparatuses 20 and control the plurality of lighting apparatuses 20. Controller 10 is, for example, installed on a wall of room 100, or built into any of the plurality of lighting apparatuses 20. In addition, controller 10 has a function of generating a map displayed by display 40, in addition to the function of controlling the plurality of lighting apparatuses 20 in normal use. The following describes in detail the function of generating a map. FIG. 2 illustrates functional structural components for generating a map, which are included in controller 10.

Controller 10 includes lighting controller 11, obtainer 12, calculator 13, associator 14, estimator 15, generator 16, and corrector 17. It should be noted that controller 10 is assumed to receive, from the plurality of lighting apparatuses 20, identification information items respectively set in advance to the plurality of lighting apparatuses 20, by broadcasting, to the plurality of lighting apparatuses 20, a command to transmit the identification information items that are set in advance to the plurality of lighting apparatuses 20 to controller 10, for example, and store the identification information items in, for example, a storage (not illustrated) included in controller 10. It should be noted that although numerals are indicated below the plurality of lighting apparatuses 20 as identification information items that are set to the plurality of lighting apparatuses 20, these numerals are indicated for explanation. Accordingly, controller 10 does not recognize which identification information item among the received identification information items is held by lighting apparatuses 20 corresponding to which one of the positions. In other words, controller 10 has merely obtained identification information at this point, and does not recognize that the identification information corresponds to which position of lighting apparatus 20.

Lighting controller 11 turns on or off the plurality of lighting apparatuses 20, according to the identification information items stored in the storage. For example, lighting controller 11 selects identification information item #5, and broadcasts, to the plurality of lighting apparatuses 20, a command to emit light when identification information item #5 is set in itself. In this manner, lighting apparatus 20a illustrated in FIG. 1 is turned on because identification information item #5 is set in lighting apparatus 20a.

Obtainer 12 causes a plurality of image sensors 30 to obtain an image. Obtainer 12, for example, issues an instruction of obtaining an image to the plurality of image sensors 30, and causes the plurality of image sensors 30 to obtain an image corresponding to the time when the instruction of obtaining an image is issued. In addition, obtainer 12 causes the plurality of image sensors 30 to transmit the obtained image to controller 10. It should be noted that obtainer 12 is capable of, for example, issuing the instruction of obtaining an image to a specific one of the plurality of image sensors 30, or issuing the instruction of obtaining an image concurrently to all of the plurality of image sensors 30.

Calculator 13 calculates a position (coordinates, for example,) of each of the plurality of lighting apparatuses 20, according to the image obtained by capturing images by the plurality of image sensors 30.

Associator 14 associates position information items (icons, for example,) indicating the positions calculated by calculator 13 with the identification information items.

Here, controller 10 does not recognize positional relationship among the plurality of image sensors 30. Accordingly, estimator 15 estimates positional relationship among the plurality of image sensors 30.

Generator 16 generates a map indicating the positions of the plurality of lighting apparatuses 20. In the map, for example, the position information items to which the identification information items are associated one-to-one are arranged according to the positions of the plurality of lighting apparatuses 20 which are actually installed.

Corrector 17 corrects the position information items arranged in the map generated by generator 16.

Operations of calculator 13, associator 14, estimator 15, generator 16, and corrector 17 will be described later in detail.

The functional structural components included in controller 10 are implemented by a processor or the like which executes a control program that is stored in the storage. However, the functional structural components included in controller 10 may be implemented by a microcomputer, a dedicated circuit, or the like.

(Operation)

The following describes an operation of lighting control system 1 according to the embodiment.

FIG. 3 is a flowchart which illustrates an example of the operation of lighting control system 1 according to the embodiment.

First, lighting controller 11 turns on or off only one of the plurality of lighting apparatuses 20 (Step S11). For example, lighting controller 11 selects one identification information item among the identification information items stored in the storage, and turns on or off only the one of the plurality of lighting apparatuses 20 which has the identification information item that is set in advance.

For example, lighting controller 11 selects identification information item #5, and turns on or off only lighting apparatus 20a which has identification information item #5 that is set in advance. At this time, lighting controller 11 turns off or on all of the other lighting apparatuses 20. When only lighting apparatus 20a is to be turned on, lighting controller 11 broadcasts, to the plurality of lighting apparatuses 20, a command to be turned on when identification information 5 is set and to be turned off when identification information 5 is not set. In this manner, only lighting apparatus 20a among lighting apparatuses 20a to 20p is turned on, and the other lighting apparatuses 20 are turned off. In addition, when only lighting apparatus 20a is to be turned off, lighting controller 11 broadcasts, to the plurality of lighting apparatuses 20, a command to be turned off when identification information 5 is set and to be turned on when identification information 5 is not set. In this manner, only lighting apparatus 20a among lighting apparatuses 20a to 20p is turned off, and the other lighting apparatuses 20 are turned on.

Next, obtainer 12 causes the plurality of image sensors 30 to obtain an image, in a state in which the only one of the plurality of lighting apparatuses 20 is turned on or off by lighting controller 11 (Step S12). For example, obtainer 12 causes the plurality of image sensors 30 (e.g., 30a-30d) to obtain an image, in a state in which only lighting apparatus 20a is turned on or off by lighting controller 11. In this manner, any of the plurality of image sensors 30, when lighting apparatus 20a is installed in proximity, obtains an image having a luminance level which is higher or lower than a luminance level of each of images obtained by the other image sensors 30. Then, the plurality of image sensors 30 transmit the captured images to controller 10.

Next, calculator 13 calculates a position of the one of the plurality of lighting apparatuses 20 which is turned on or off by lighting controller 11, on the basis of the luminance level recognized as a result of, for example, image recognition, etc., in the images obtained by the plurality of image sensors 30 (Step S13). For example, calculator 13 is capable of recognizing a luminance level for each of pixels of image sensor 30. At this time, calculator 13 associates only one of the plurality of lighting apparatuses 20 which is turned on or off with image sensor 30 which has obtained an image including a region having a minimum luminance level or a maximum luminance level among the images obtained by capturing images of the irradiation surface by the plurality of image sensors 30 in a state in which the only one of the plurality of lighting apparatuses 20 is turned on or off. For example, in the case where image sensors 30a to 30d capture images of the irradiation surface when only lighting apparatus 20a to which identification information item #5 is set is turned on or off, the image obtained by image sensor 30a positioned closest to lighting apparatus 20a includes a region having the minimum luminance level or the maximum luminance level. Accordingly, calculator 13 associates lighting apparatuses 20a with image sensor 30a which has obtained an image including a region having the minimum luminance level or the maximum luminance level among the images obtained by capturing images of the irradiation surface by the plurality of image sensors 30 in a state in which only lighting apparatus 20a among the plurality of lighting apparatuses 20 is turned on or off. Here, to associate lighting apparatus 20a with image sensor 30a means to associate identification information item #5 that is set to lighting apparatus 20a with image sensor 30a. It should be noted that calculator 13 calculates, as a position of one of the plurality of lighting apparatuses 20 which is turned on or off, a position (relative coordinates) relative to image sensor 30 associated with the one of the plurality of lighting apparatuses 20. For example, calculator 13 calculates a position (relative coordinates) relative to image sensor 30a associated with lighting apparatus 20a, as a position of lighting apparatus 20a which is turned on or off. Details of the operation performed by calculator 13 will be described later with reference to FIG. 4A to FIG. 4C.

Next, associator 14 associates the identification information item that is set in advance to lighting apparatus 20 of which the position is calculated by calculator 13 with a position information item indicating the position (Step S14). For example, associator 14 associates identification information item #5 that is set in advance to lighting apparatus 20a which is turned on or off, with the position information item indicating the position of lighting apparatus 20a which is calculated by calculator 13 (a position relative to image sensor 30a). The position information item is an icon to be disposed at the position (coordinates) calculated by calculator 13 on a map generated by generator 16. Hereinafter, to associate an identification information item with a position information item indicating a position of lighting apparatus 20 which is calculated by calculator 13 is also described as to associate an identification information item with a position information item of lighting apparatus 20. Association performed by associator 14 will be described later with reference to FIG. 5.

Then, for example, lighting controller 11 determines whether or not the operation of turning on or off only one of the plurality of lighting apparatuses 20 has been performed for each of the plurality of lighting apparatuses 20 (Step S15).

When the operation of turning on or off only one of the plurality of lighting apparatuses 20 has not been performed by lighting controller 11 for each of the plurality of lighting apparatuses 20 (No in Step S15), the processes from Step S11 to Step S15 are repeated. For example, when the operation of turning on or off only one of the plurality of lighting apparatuses 20 has been performed by lighting controller 11 for only lighting apparatus 20a, lighting controller 11 selects an identification information item other than identification information item #5 in Step S11, and turns on or off only one of lighting apparatuses 20 other than lighting apparatus 20a. Then, associator 14 associates an identification information item that is set in advance to the one of lighting apparatuses 20 which is turned on or off, with a position information item of the one of lighting apparatuses 20 which is turned on or off. As described above, the processes from Step S11 to Step S15 are repeated. Accordingly, the operation of turning on or off only one of the plurality of lighting apparatuses 20 is performed for each of the plurality of lighting apparatuses 20, and the identification information item that is set in advance to the one of the plurality of lighting apparatuses 20 which is turned on or off is associated with the position information item of the one of the plurality of lighting apparatuses 20 which is turned on or off. In this manner, associator 14 associates identification information items one-to-one with position information items of the plurality of lighting apparatuses 20.

As described above, in the state in which only one of the plurality of lighting apparatuses 20 is turned on or off, calculator 13 calculates a position of the one of the plurality of lighting apparatuses 20, on the basis of a luminance level in an image obtained by capturing an image of the irradiation surface by at least one image sensor 30 (a plurality of image sensors 30). Then, calculator 13 performs the above-described calculation for each of the plurality of lighting apparatuses 20, thereby obtaining a position of each of the plurality of lighting apparatuses 20 (a position relative to the nearest image sensor 30). In addition, every time calculator 13 calculates a position of one of the plurality of lighting apparatuses 20 which is turned on or off, associator 14 associates an identification information item that is set in advance to the one the plurality of lighting apparatuses 20 which is turned on or off, with a position information item indicating the position of one of the plurality of lighting apparatuses 20 which is turned on or off.

When the operation of turning on or off only one of the plurality of lighting apparatuses 20 has been performed by lighting controller 11 for each of the plurality of lighting apparatuses 20 (Yes in Step S15), estimator 15 estimates positional relationship among the plurality of image sensors 30 (Step S16). Details of the operation performed by estimator 15 will be described later with reference to FIG. 6A to FIG. 6C.

Next, generator 16 generates a map which can be displayed by display 40. In the map, the position information items associated with identification information items by associator 14 are arranged according to the positional relationship among the plurality of image sensors 30 estimated by estimator 15 (Step S17). It is possible to represent, by a single coordinate system, a position of each of the plurality of lighting apparatuses 20 relative to image sensor 30, by estimating the positional relationship among the plurality of image sensors 30. It should be noted that it is possible to generate a map as long as the positional relationship among the plurality of image sensors 30 and the position of each of the plurality of lighting apparatuses 20 relative to image sensor 30 are known, even if absolute positions of the plurality of image sensors 30 on the map are unknown. Accordingly, generator 16 can identify the position of lighting apparatus 20 associated with different image sensor 30, on the basis of the positional relationship among the plurality of image sensors 30 estimated by estimator 15, and thus can arrange position information items associated with identification information items, on positions on the map which correspond to positions of the plurality of lighting apparatuses which are actually installed.

It should be noted that, although the details will be given later with reference to FIG. 8 to FIG. 9B, corrector 17 corrects a position information item when the position information items on the map are irregularly arranged.

Display 40 receives a map generated by generator 16 from controller 10, thereby displaying the map. Since the position information items associated with the identification information items are arranged by simulating the positions of the plurality of lighting apparatuses 20 which are actually installed, it is possible to control intended lighting apparatus 20 by operating an icon on the map displayed by display 40.

(Operation of Calculator)

Here, details of an operation performed by calculator 13 will be described with reference to FIG. 4A and FIG. 4C.

Figure 4A:
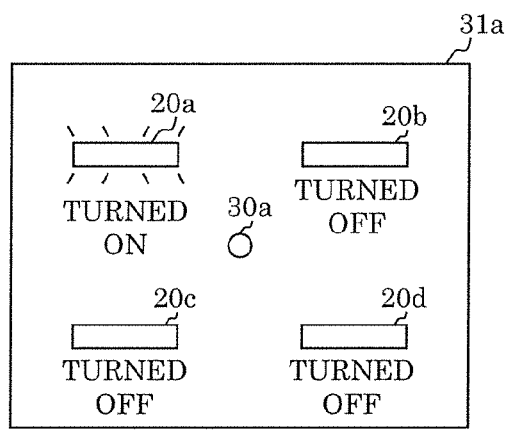
FIG. 4A is a diagram which illustrates an example of an imaging range of an image sensor according to the embodiment.

FIG. 4A is a diagram which illustrates an example of an imaging range of image sensor 30 according to the embodiment.

Imaging range 31a of image sensor 30a is illustrated in FIG. 4A. In addition, image sensor 30a installed on a ceiling and lighting apparatuses 20a to 20d installed in proximity to image sensor 30a are also illustrated in FIG. 4A for the purpose of explanation. Furthermore, it is assumed that lighting controller 11 turns on only lighting apparatuses 20a. Image sensor 30a captures an image of the irradiation surface, thereby obtaining an image of imaging range 31a. At this time, image sensors 30b to 30d also capture images of the irradiation surface, thereby obtaining images of the respective imaging ranges. However, calculator 13 associates lighting apparatuses 20a with image sensor 30a which has obtained an image including a region having a minimum luminance level or a maximum luminance level among the images obtained by capturing images of the irradiation surface by image sensors 30a to 30d in a state in which only lighting apparatus 20a is turned on. Accordingly, calculator 13 calculates a position of lighting apparatus 20a relative to image sensor 30a, and thus the following describes image 32a obtained by image sensor 30a.

FIG. 4B is a diagram which illustrates an example of luminance distribution of image 32a obtained by image sensor 30a according to the embodiment.

Although a luminance change is not indicated in image 32a illustrated in FIG. 4B, a luminance level of the irradiation surface positioned under lighting apparatus 20a which is turned on in imaging range 31a illustrated in FIG. 4A is increased in image 32a. In other words, calculator 13 can recognize that lighting apparatus 20a is installed on a ceiling side of a region having an increased luminance level in image 32a.

Calculator 13 calculates a position at which a luminance level indicates a maximum or minimum value in image 32a obtained by image sensor 30a, as a position of lighting apparatus 20a which is turned on or off. When only lighting apparatus 20a is turned on, calculator 13 calculates the position at which the luminance level indicates the maximum value in image 32a, as a position of lighting apparatus 20a. More specifically, calculator 13 calculates a position at which an x-coordinate luminance level and a Y-coordinate luminance level indicate the maximum values in image 32a, as a position of lighting apparatus 20a. A luminance distribution of the X-coordinate of image 32a (the horizontal direction in FIG. 4B) is indicated in the lower side of FIG. 4B, and a luminance distribution of the Y-coordinate of image 32a (the vertical direction in FIG. 4B) is indicated in the right side of FIG. 4B. In this manner, calculator 13 calculates a position of lighting apparatus 20a as the position of point 33a. Calculator 13, for example, previously recognizes a correspondence relationship between: a distance between pixels of image sensor 30a; and an actual distance in imaging range 31a, thereby calculating coordinates relative to image sensor 30a as the position of point 33a. When only lighting apparatus 20a is turned off, calculator 13 calculates the position at which the luminance level indicates the minimum value in image 32a, as the position of lighting apparatus 20a. More specifically, calculator 13 calculates a position at which an x-coordinate luminance level and a Y-coordinate luminance level indicate the minimum values in image 32a, as the position of lighting apparatus 20a.

It should be noted that, when calculator 13 calculates a position (pixel) at which merely a luminance level indicates the maximum or the minimum as the position of lighting apparatus 20a, there are instances where the position calculated by calculator 13 is not accurate in the case where the reflectance of the irradiation surface is non-uniform. For example, when a blackish region having a low reflectance is located right below the location at which lighting apparatus 20a is installed, there are instances where a position different from the blackish region has the maximum luminance level, and thus it is not possible to calculate an accurate position. In the same manner as above, for example, when a whitish region having a high reflectance is located right below the location at which lighting apparatus 20a is installed, there are instances where a position different from the whitish region has the minimum luminance level, and thus it is not possible to calculate an accurate position. In view of the above, even when a region includes a portion having a high or low luminance level, it is possible to easily calculate an accurate position of lighting apparatus 20, by comparing average luminance levels in ranges each having a certain area and calculating, for example, a center of a range having an average luminance level indicating a maximum or minimum value.

Figures 4C, 5:
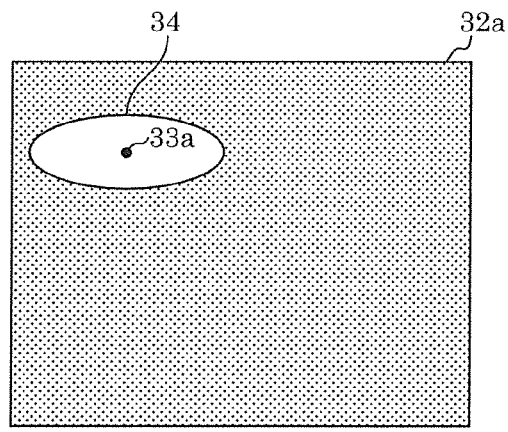
FIG. 4C is a diagram which illustrates an example of an image resulting from binarizing an image obtained by the image sensor according to the embodiment.
FIG. 5 is a diagram which illustrates an example of associating identification information items with position information items.

In addition, calculator 13 may calculate the position of lighting apparatus 20a by binarizing image 32a as illustrated in FIG. 4C.

FIG. 4C is a diagram which illustrates an example of image 32a resulting from binarizing image 32a obtained by image sensor 30a according to the embodiment. FIG. 4C illustrates region 34 having a high luminance level. At this time, calculator 13 binarizes an image obtained by image sensor 30a when only lighting apparatus 20a is turned on as illustrated in FIG. 4A.

Calculator 13 binarizes image 32a using a predetermined luminance threshold. The predetermined luminance threshold is not specifically limited. The predetermined luminance threshold is determined to be such a value that a change in a luminance level of the irradiation surface caused by lighting apparatus 20 which is turned on or off can be recognized.

For example, when image 32a includes a plurality of regions each having a luminance level greater than or equal to the predetermined luminance threshold, it is highly likely that lighting apparatus 20a is installed on a ceiling at a position corresponding to a region having the largest area among the plurality of regions each having a luminance level greater than or equal to the predetermined luminance threshold. It is also highly likely that lighting apparatus 20a is installed on a ceiling at a position corresponding to a centroid position among the regions each having a luminance level greater than or equal to the predetermined luminance threshold. Accordingly, when only lighting apparatus 20a is turned on, calculator 13 calculates, as the position of lighting apparatus 20a, the centroid position of a region having the largest area among the regions each having a luminance level greater than or equal to the predetermined luminance threshold in binarized image 32a. In this manner, calculator 13 calculates a position of lighting apparatus 20a as the position of point 33a (centroid position). When only lighting apparatus 20a is turned off, calculator 13 calculates, as the position of lighting apparatus 20a, the centroid position of a region having the largest area among the regions each having a luminance level less than or equal to the predetermined luminance threshold in binarized image 32a.

As described above, calculator 13 calculates a position (coordinates, for example) of lighting apparatus 20 which is turned on or off. Then, associator 14 associates the identification information item that is set in advance to lighting apparatus 20 which is turned on or off, with a position information item indicating the position calculated by calculator 13. FIG. 5 illustrates association performed by associator 14.

FIG. 5 is a diagram which illustrates an example of associating identification information items with position information items.

FIG. 5 illustrates, as an example, an association between identification information items #5, #8, #11, and #10 (lighting apparatuses 20a to 20d) which are associated with image sensor 30a by calculator 13 and position information items (relative coordinates) indicating positions relative to image sensor 30a. For example, associator 14 associates identification information #5 with a position information item (icon) to be arranged on a map at a position corresponding to coordinates $(X_1, Y_1)$ relative to image sensor 30a. In the same manner as the association illustrated in FIG. 5, identification information items #12, #3, #6, and #15 (lighting apparatuses 20e to 20h) which are associated with image sensor 30b by calculator 13 are associated with position information items indicating positions relative to image sensor 30b, identification information items #2, #14, #16, and #7 (lighting apparatuses 20i to 20l) which are associated with image sensor 30c by calculator 13 are associated with position information items indicating positions relative to image sensor 30c, and identification information items #1, #9, #13, and #4 (lighting apparatuses 20m to 20p) which are associated with image sensor 30d by calculator 13 are associated with position information items indicating positions relative to image sensor 30d.

(Operation of Estimator)

Figure 6B:
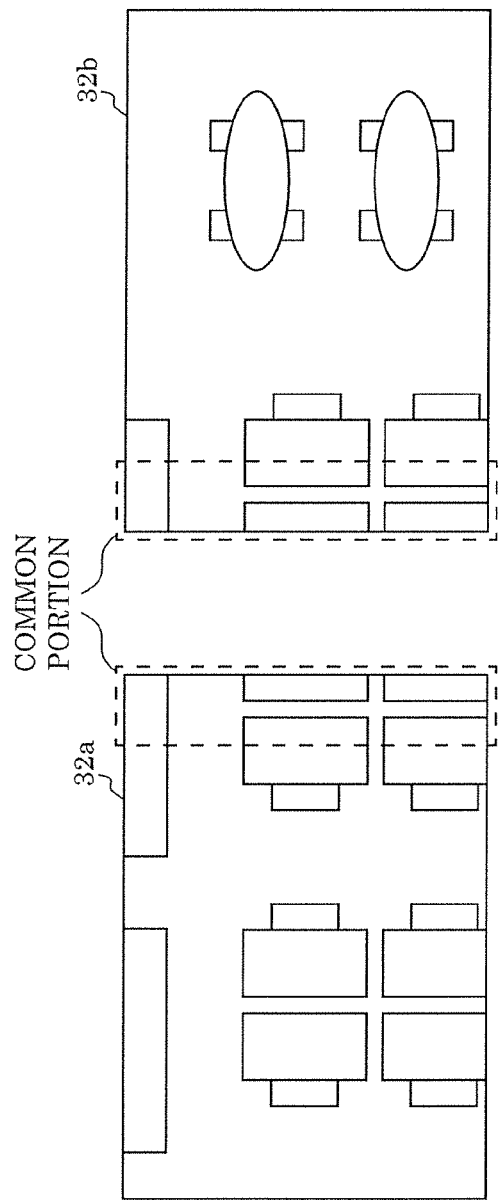
FIG. 6B is an explanation diagram for explaining an example of a method of estimating positional relationship among the plurality of image sensors.

The following describes details of an operation performed by estimator 15 with reference to FIG. 6A to FIG. 6C.

FIG. 6A to FIG. 6C are each an explanation diagram for explaining an example of a method of estimating positional relationship among the plurality of image sensors 30.

First, an example of the method of estimating positional relationship among the plurality of image sensors 30 will be described with reference to FIG. 6A. It should be noted that, in the method described with reference to FIG. 6A, estimator 15 is assumed to previously recognize installation intervals between the plurality of image sensors 30.

For example, as illustrated in FIG. 6A, lighting controller 11 turns on only lighting apparatuses 20i to 20l which are associated with image sensor 30c, and turns off the other lighting apparatuses 20. More specifically, lighting controller 11 broadcasts, to the plurality of lighting apparatuses 20, a command to turn on lighting apparatus 20 to which identification information items #2, #14, or #16 is set, and turn off lighting apparatuses 20 to which identification information items #2, #14, or #16 is not set. In this state, obtainer 12 causes the other image sensors 30a, 30b, and 30e to obtain an image. In this manner, image sensor 30a obtains image 32a, image sensor 30b obtains image 32b, and image sensor 30d obtains image 32d. As illustrated in FIG. 6A, image 32a, image 32b, and image 32d include region 34 having a high luminance level on the lower side, on the left lower side, and on the left side, respectively. Accordingly, estimator 15 estimates that image sensor 30a is located on the upper side of image sensor 30c, image sensor 30b is located on the right upper side of image sensor 30c, and image sensor 30d is located on the right side of image sensor 30c. In the same manner as above, estimator 15 estimates positions of image sensors 30b to 30d relative to image sensor 30a, according to luminance levels of images 32b to 32d when only lighting apparatuses 20a to 20d which are associated with image sensor 30a are turned on. The same holds true for image sensors 30b and 30d, and thus description for image sensors 30b and 30d will be omitted. In this manner, estimator 15 estimates the positional relationship among the plurality of image sensors 30, according to the luminance levels of images obtained by the other image sensors 30 when lighting apparatus 20 which is associated with one of the plurality of image sensors 30 is turned on.

It should be noted that estimator 15 may estimate the positional relationship among the plurality of image sensors 30, according to the luminance levels of images obtained by the other image sensors 30 when lighting apparatus 20 which is associated with one of the plurality of image sensors 30 is turned off. In this case, estimator 15 estimates the positional relationship among the plurality of image sensors 30, according to a region having a low luminance level in the image.

Next, another example of the method of estimating positional relationship among the plurality of image sensors 30 will be described with reference to FIG. 6B. It should be noted that, in the method described with reference to FIG. 6B and FIG. 6C which will be described later, imaging ranges of image sensors 30 which are installed at positions adjacent side by side among the plurality of image sensors 30 are assumed to include an overlapping region.

For example, estimator 15 compares images 32a to 32d obtained by image sensors 30a to 30d. More specifically, estimator 15 compares layout images including, for example, chairs, desks or shelves, which are included in images 32a to 32d. When a common portion is included on the right sided of image 32a and the left side of image 32b in the layout images as illustrated in FIG. 6B, estimator 15 estimates that image sensor 30a and image sensor 30b are disposed at positions adjacent side by side. In addition, estimator 15 may estimate a distance between image sensor 30a and image sensor 30b, on the basis of an overlapping amount of the common portion. In this manner, estimator 15 estimates positional relationship among the plurality of image sensors 30, according to, for example, a common portion of layout images included in the plurality of images obtained by the plurality of image sensors 30. It should be noted that, in the case where a characteristic pattern is drawn on a floor when a chair, a desk, or a shelf is not disposed in room 100, estimator 15 may estimate positional relationship among the plurality of image sensors 30, according to, for example, a common portion of the pattern on the floor included in the plurality of images obtained by the plurality of image sensors 30.

In addition, yet another example of the method of estimating positional relationship among the plurality of image sensors 30 will be described with reference to FIG. 6C.

For example, estimator 15 compares images 32a to 32d obtained by image sensors 30a to 30d. More specifically, estimator 15 compares luminance distributions of images 32a to 32d. When a common portion of the luminance distribution is included on the right sided of image 32a and the left side of image 32b as illustrated in FIG. 6C, estimator 15 estimates that image sensor 30a and image sensor 30b are disposed at positions adjacent side by side. It should be noted that, in order to facilitate recognizing a common portion of the luminance distribution for estimator 15, for example, the plurality of lighting apparatuses 20 may be turned on unevenly, or the plurality of lighting apparatuses 20 may be each caused to emit light according to a dimming rate different for each of the plurality of lighting apparatuses 20. In addition, estimator 15 may estimate a distance between image sensor 30a and image sensor 30b, on the basis of an overlapping amount of the common portion. In this manner, estimator 15 estimates positional relationship among the plurality of image sensors 30, according to, for example, a common portion of the luminance distribution0 included in the plurality of images obtained by the plurality of image sensors 30. In this manner, estimator 15 estimates relative positional relationship among the plurality of image sensors 30.

(Map Display by Display)

Next, a map generated by generator 16 and displayed by display 40 will be described with reference to FIG. 7.

Figure 7:
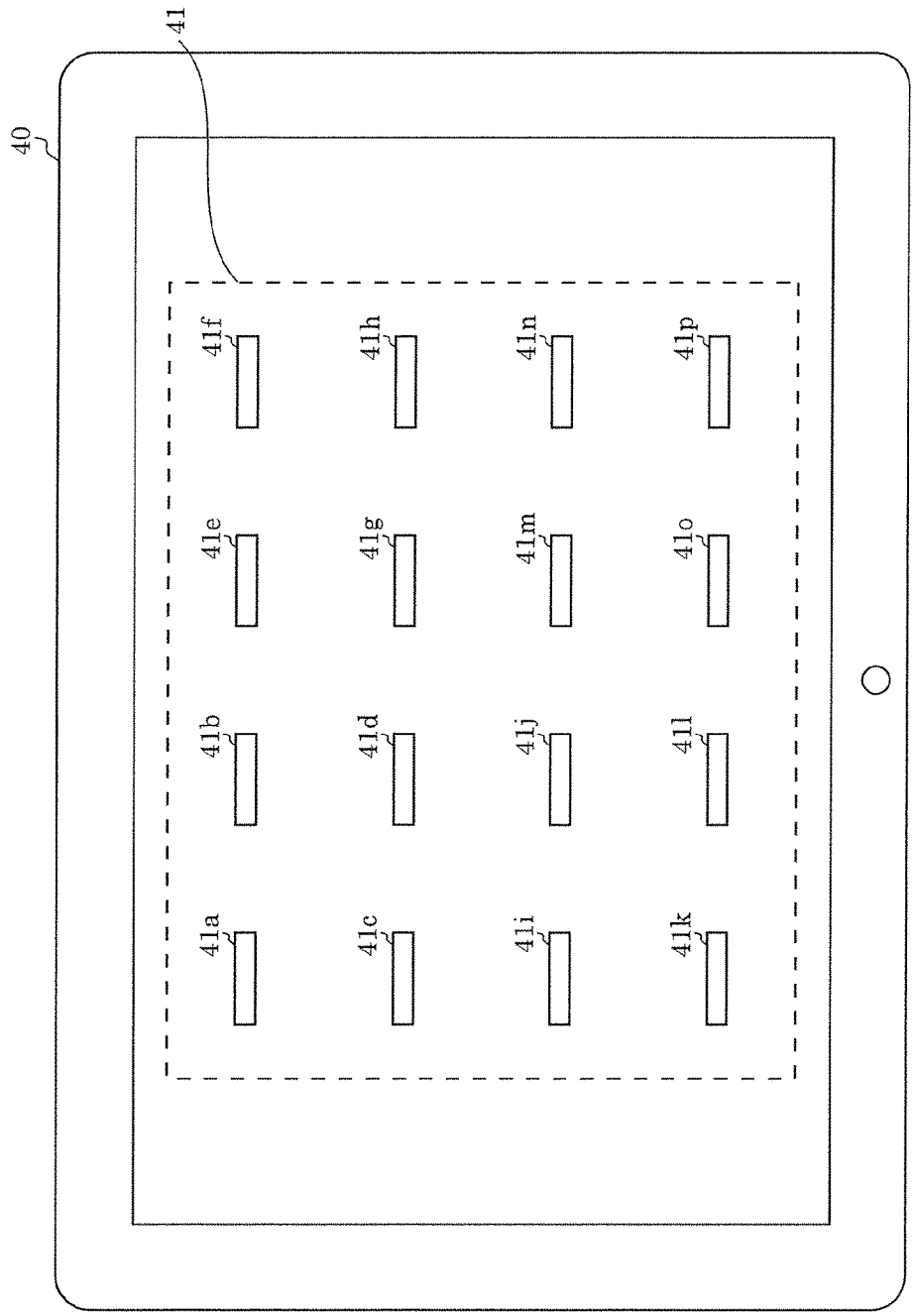
FIG. 7 is a diagram which illustrates an example of a map displayed by a display according to the embodiment.

FIG. 7 is a diagram which illustrates an example of map 41 displayed by display 40 according to the embodiment.

Since estimator 15 has estimated relative positional relationship among the plurality of image sensors 30, generator 16 generates map 41 indicating positions of the plurality of lighting apparatuses 20 which are actually installed, by arranging, according to the positional relationship among the plurality of image sensors 30 estimated by estimator 15, position information items 41a to 41p associated one to one with the identification information items by associator 14. Then, map 41 generated by generator 16 is transmitted to display 40, enabling display 40 to display map 41 as illustrated in FIG. 7. In this manner, it is possible to control intended lighting apparatus 20 by performing an operation on position information items 41a to 41p on map 41 displayed by display 40. For example, it is possible to perform turning on or off, dimming, color-adjusting, etc., of lighting apparatus 20a, by operating icon 41a by a user. It should be noted that, although not illustrated in FIG. 7, identification information items (communication addresses, etc.) of the plurality of lighting apparatuses 20 may be displayed on map 41.

It should be noted that, although position information items 41a to 41p arranged in rows and columns are illustrated in FIG. 7 as with the arrangement of the plurality of lighting apparatuses 20 which are actually installed, position information items 41a to 41p are not necessarily be arranged in this manner. For example, as illustrated in FIG. 8, there are instances where position information items 41a to 41p are arranged irregularly.

Figure 8:
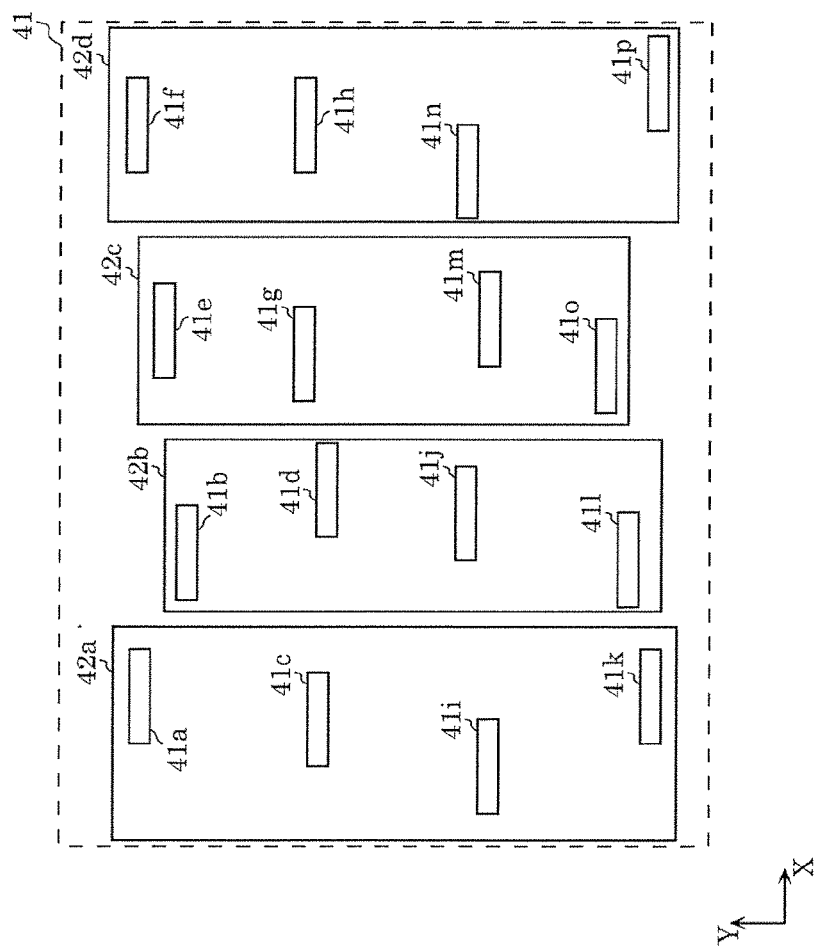
FIG. 8 is a diagram which illustrates a state in which positions of the position information items on a map are irregularly arranged.

FIG. 8 is a diagram which illustrates a state in which positions of position information items 41a to 41p on map 41 are irregularly arranged.

In the case where, when calculator 13 calculates positions of the plurality of lighting apparatuses 20, light other than the illumination light emitted by the plurality of lighting apparatuses 20 enters room 100, the reflectance of the irradiation surface that is irradiated by the plurality of lighting apparatuses 20 is non-uniform, or the like, the positions calculated by calculator 13 and the actual positions are misaligned. As a result, there are instances where the positions of position information items 41a to 41p are irregularly arranged as illustrated in FIG. 8.

(Corrector)

In view of the above, corrector 17 corrects the position information items. More specifically, corrector 17 performs the correction on the basis of input information items indicating the total number of the plurality of lighting apparatuses 20 installed in a row and the total number of the plurality of lighting apparatuses 20 installed in a column. As illustrated in FIG. 1, the plurality of lighting apparatuses 20 are installed in alignment in room 100, and the total number of the plurality of lighting apparatuses 20 in a row and the total number of the plurality of lighting apparatuses 20 in a column are equal to each other. In room 100, the total number of the plurality of lighting apparatuses 20 installed in each of the row and the column is four, for example. A user inputs information indicating that the total number of the plurality of lighting apparatuses 20 in a row and the total number of the plurality of lighting apparatuses 20 in a column are each four, as the input information item, to controller 10, for example. It should be noted that the user may input the input information item to controller 10 via display 40.

Corrector 17 divides the plurality of lighting apparatuses 20 into groups as illustrated in FIG. 8, on the basis of the total number of the plurality of lighting apparatuses 20 installed for each column, for example. Here, a point at the bottom left of map 41 illustrated in FIG. 8 is assumed to be the origin of position information items 41a to 41p. Corrector 17 generates a group by selecting, from among the position information items arranged on map 41, four position information items which are close to the origin (0) in the X-coordinate, for example, on the basis of the fact that the total number of the plurality of lighting apparatuses 20 installed for each column is four. For example, since the X-coordinates of position information items 41i, 41c, 41a, and 41k are close to the origin, corrector 17 groups position information items 41i, 41c, 41a, and 41k into group 42a. Next, since the X-coordinates of position information items 41l, 41b, 41j, and 41d are close to the origin next to group 42a, corrector 17 groups position information items 41l, 41b, 41j, and 41d into group 42b. In the same manner as above, corrector 17 generates groups 42c and 42d.

Next, corrector 17 corrects irregularity in the position information items using a method which is explained with reference to FIG. 9A or FIG. 9B.

Figure 9A:
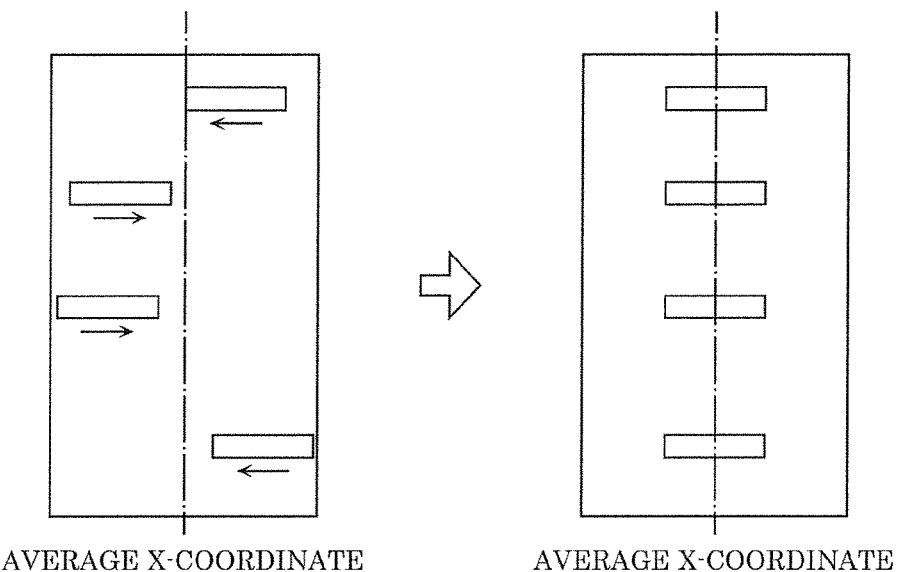
FIG. 9A is an explanation diagram for explaining a method of correcting irregularity in positions of the position information items.
Figure 9B:
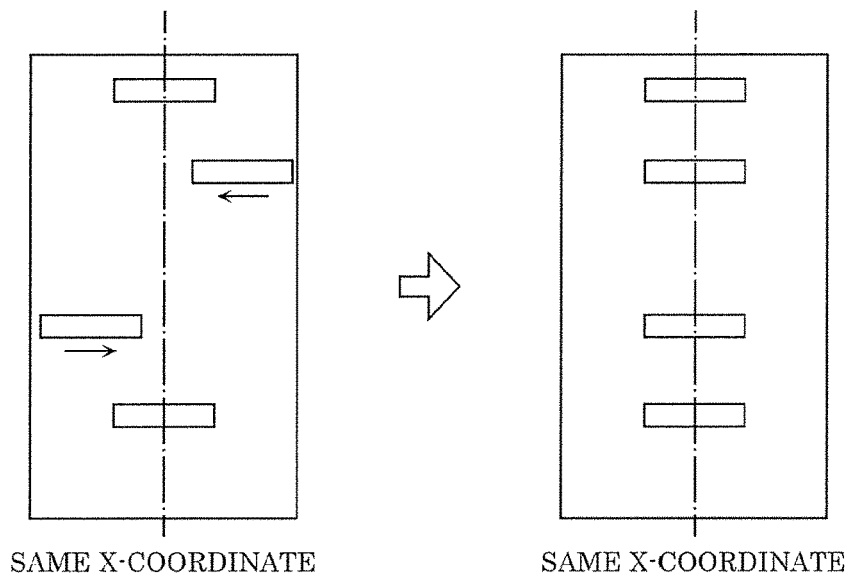
FIG. 9B is an explanation diagram for explaining a method of correcting irregularity in positions of the position information items.

FIG. 9A and FIG. 9B are each an explanation diagram for explaining a method of correcting irregularity in positions of the position information items.

For example, as illustrated in FIG. 9A, corrector 17 corrects each of the X-coordinates of the position information items that are grouped into one group, to a coordinate resulting from averaging the X-coordinates of the position information items.

In addition, for example, as illustrated in FIG. 9B, corrector 17 corrects each of the X-coordinates of the position information items that are grouped into one group, to a coordinate corresponding to a majority of the position information items. For example, in FIG. 9B, since the X-coordinates of the position information items located at an uppermost position and a lowermost position among the four position information items vertically disposed are the same, the X-coordinates of two of the position information items located in the middle are corrected to the X-coordinate that corresponds to the position information items located at an uppermost position and a lowermost position.

In this manner, position information items 41$a$ to 41$p$ are corrected such that the position information items are aligned for each column that includes the number of position information items indicated by the input information item. It should be noted that corrector 17 corrects position information items 41$a$ to 41$p$ such that the position information items are aligned for each row that includes the number of position information items indicated by the input information item, in the same manner as the method of aligning position information items 41$a$ to 41$p$ for each column.

(Advantageous Effects, Etc.)

Conventionally, a large amount of time is taken for generating a map in the lighting control system, and an operation error might occur when an icon is dragged. Accordingly, it involves significantly cumbersome work.

In view of the above, lighting control system 1 according to the present embodiment includes a plurality of lighting apparatuses 20 each having an identification information item that is set in advance, controller 10, at least one image sensor 30 which captures an image of an irradiation surface that is irradiated by the plurality of lighting apparatuses 20, and display 40. Controller 10 includes calculator 13 which performs calculation of a position of one of the plurality of lighting apparatuses 20, on a basis of a luminance level in an image obtained by capturing the image of the irradiation surface by at least one image sensor 30 in a state in which only the one of the plurality of lighting apparatuses 20 is turned on or off. Calculator 13 performs the above-described calculation for each of the plurality of lighting apparatuses 20, thereby obtaining a position of each of the plurality of lighting apparatuses 20. In addition controller 10 includes associator 14 which, every time calculator 13 performs the calculation of a position of one of the plurality of lighting apparatuses 20 which is turned on or off, associates the identification information item that is set in advance to the one of the plurality of lighting apparatuses 20, with a position information item indicating the position of the one of the plurality of lighting apparatuses 20. In addition, controller 10 includes generator 16 which generates map 41 that can be displayed by display 40. Map 41 includes the position information items associated with the identification information items by associator 14. The position information items are arranged in map 41.

In this manner, controller 10 turns on or off only one of the plurality of lighting apparatuses 20, and calculates, in such a state, a position of the one of the plurality of lighting apparatus 20, using an image obtained by image sensor 30. Controller 10 associates position information items (icons, for example,) indicating the positions calculated, with identification information items. Then, controller 10 is capable of generating a map in which position information items of the plurality of lighting apparatuses 20 are arranged according to positions (coordinates, for example) indicated by the position information items, by performing, for each of the plurality of lighting apparatuses 20, calculation of a position and association of a position information item indicating the calculated position with an identification information item. In other words, it is possible to automate the processes which need to be performed by humans in conventional techniques; that is, the processes of confirming a position of a lighting apparatus by approaching to the lighting apparatus which has actually blinked or the like, and arranging position information items (icons) on a map such that the position information items (icons) match the positions of the lighting apparatuses actually installed (i.e., generating a map). Accordingly, it is possible to readily generate a map in the lighting control system.

For example, calculator 13 calculates a position at which a luminance level indicates a maximum or minimum value in the image, as the position of the one of the plurality of lighting apparatuses 20 which is turned on or off.

In this manner, it is possible to easily calculate a position of lighting apparatus 20.

In addition, for example, calculator 13 binarizes the image using a predetermined luminance threshold, and calculates a centroid position of a region having a largest area among regions having either one of (i) luminance levels greater than or equal to the predetermined luminance threshold and (ii) luminance levels less than or equal to the predetermined luminance threshold, in the image binarized, as the position of the one of the plurality of lighting apparatuses 20 which is turned on or off.

In this manner, it is possible to readily calculate a position of lighting apparatus 20, by only setting a predetermined luminance threshold to controller 10, for example.

In addition, the at least one image sensor 30 includes a plurality of image sensors 30. Lighting control system 1 further includes estimator 15 which estimates positional relationship among the plurality of image sensors 30. Calculator 13, further, associates the one of the plurality of lighting apparatuses 20 which is turned on or off with one of the plurality of image sensors 30 which has obtained an image including a region having a minimum luminance level or a maximum luminance level among images obtained by capturing images of the irradiation surface by the plurality of image sensors 30 in the state in which the only one of the plurality of lighting apparatuses 20 is turned on or off. And, calculator 13 calculates, as a position of the one of the lighting apparatuses 20, a position relative to the one of the plurality of image sensors 30 associated with the one of the lighting apparatuses 20. Generator 16 generates map 41 in which the position information items associated with the identification information items by the associator are arranged according to the positional relationship estimated by estimator 15.

In this manner, it is possible to represent, by a single coordinate system, a position of lighting apparatus 20 relative to a single image sensor 30 and a position of another lighting apparatus 20 relative to another image sensor 30. Accordingly, by installing a plurality of image sensors 30 in a large area, it is possible to generate map 41 which extends over a larger area than map 41 generated using a single image sensor 30

For example, estimator 15 estimates the positional relationship among the plurality of image sensors 30 according to luminance levels in a plurality of images obtained by the plurality of image sensors 30 other than the one of the plurality of image sensors 30 which is associated with the one of the plurality of lighting apparatuses 20 which is turned on or off.

In this manner, it is possible to readily estimate the positional relationship among the plurality of image sensors 30.

In addition, for example, estimator 15 estimates the positional relationship among the plurality of image sensors 30 according to a common portion in the plurality of images obtained by the plurality of image sensors 30.

In this manner, it is possible to readily estimate the positional relationship among the plurality of image sensors 30.

In addition, lighting control system 1 further includes corrector 17 which performs correction on the position information item, on a basis of an input information item indicating, among the plurality of lighting apparatuses 20 which are arranged in rows and columns, a total number of the plurality of lighting apparatuses 20 disposed in a row and a total number of the plurality of lighting apparatuses 20 disposed in a column.

In this manner, it is possible to align position information items for each row and for each column, even when positions of the position information items are irregularly arranged in map 41.

In addition, image sensor 30 has a function of at least one of a human sensor and a luminance sensor.

In this manner, since image sensor 30 is a camera or the like which is capable of detecting presence or absence of a person or a luminance level, it is possible to use image sensor 30 as a human sensor or a luminance sensor generally used in lighting control systems, even after map 41 is generated.

(Other Embodiments)

Although lighting control system 1 according to the embodiment has been described thus far, the present disclosure is not limited to the above-described embodiment.

For example, although at least one image sensor 30 comprises a plurality of image sensors 30 according to the foregoing embodiment, the present disclosure is not limited to this example. For example, the at least one image sensor 30 may be a single image sensor 30. In this case, lighting control system 1 (controller 10) need not include estimator 15, and generator 16 may generate map 41 in which position information items associated with identification information items by associator 14 irrespective of estimator 15. It is possible to calculate the positions of a plurality of lighting apparatuses 20 relative to the single image sensor 30 in this case as well, and thus map 41 can be generated. However, when map 41 which extends over a large area is generated, a plurality of image sensors 30 may be installed in the area.

In addition, for example, display 40 is a terminal such as a tablet terminal, a smartphone, or a remote controller according to the foregoing embodiment. However, display 40 is not limited to this example, and may be integrated with controller 10, for example.

In addition, for example, controller 10 and image sensor 30 are provided separately according to the foregoing embodiment. However, controller 10 and image sensor 30 are not limited to this example, and may be integrated with each other. In other words, image sensor 30 may have a function of controller 10.

In addition, for example, lighting control system 1 includes a single controller 10 according to the foregoing embodiment. However, lighting control system 1 is not limited to this example. For example, lighting control system 1 may include controller 10 for each image sensor 30. In this case, one of a plurality of controllers 10 may be a master which controls other controllers 10.

In addition, a plurality of lighting apparatuses 20 are installed in room 100 in such a manner that each row includes the same number of lighting apparatuses 20 and each column includes the same number of lighting apparatuses 20 as illustrated in FIG. 1 according to the foregoing embodiment. However, lighting apparatuses 20 are not necessarily arranged in such a manner, depending on a shape of room 100 or a position of air-conditioning equipment (air conditioner) or the like installed on a ceiling. For example, as illustrated in FIG. 10A, there are instances where a plurality of lighting apparatuses are installed in room 100a which is not rectangular and including air-conditioning equipment installed on the ceiling.

Figure 10A:
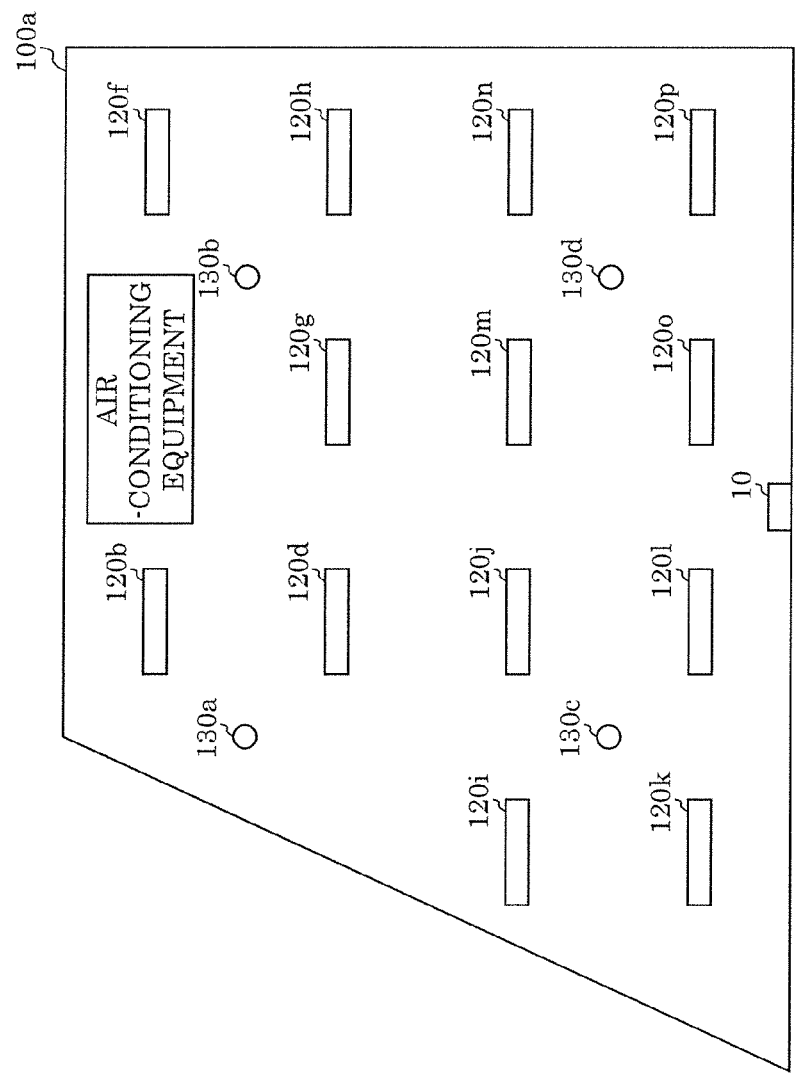
FIG. 10A is a diagram illustrating another example of a room in which a lighting control system according to other embodiments is applied.

FIG. 10A is a diagram illustrating another example of a room in which a lighting control system according to the other embodiments is applied. FIG. 10A is a diagram illustrating room 100a viewed from the ceiling side, in which lighting apparatuses 120b, 120d, and 120f to 210p which are installed on the ceiling, and image sensors 130a to 130d installed on the ceiling are also illustrated. It should be noted that, in the description below, lighting apparatuses 120b, 120d, and 120f to 120p are also collectively referred to as lighting apparatus 120, and image sensors 130a to 130d are also collectively referred to as image sensor 130. Since room 100a has a trapezoidal shape, lighting apparatuses corresponding to lighting apparatuses 20a and 20b are not installed in room 100a. In addition, since air-conditioning equipment is installed on the ceiling of room 100a, a lighting apparatus corresponding to lighting apparatus 20e is not installed in room 100a. It is assumed that the lighting control system applied to room 100a generates map 141 illustrated in FIG. 10B, for example.

Figure 10B:
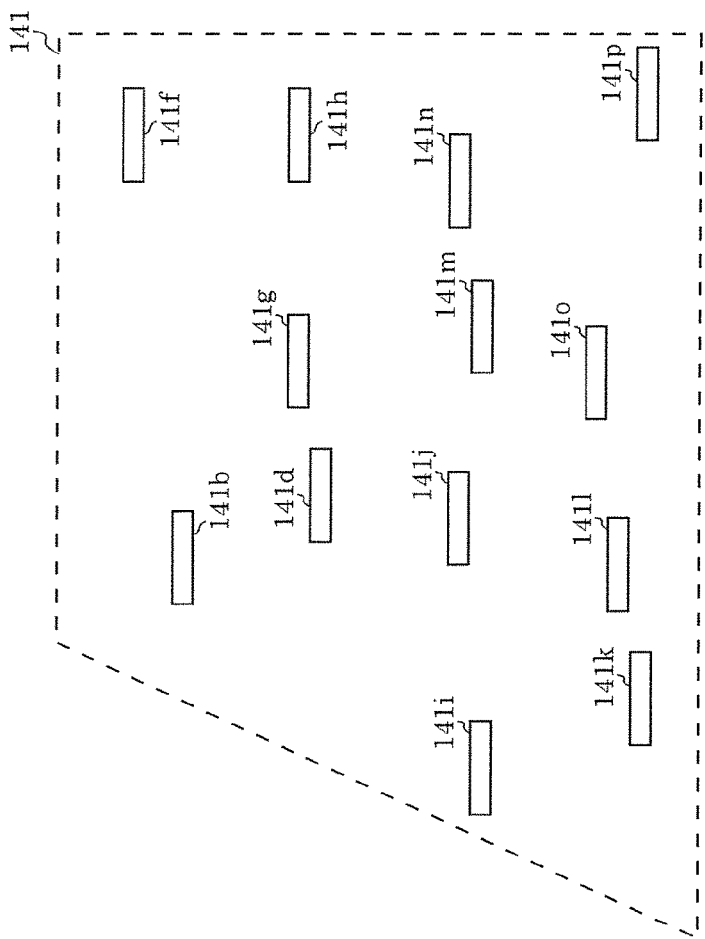
FIG. 10B is a diagram which illustrates a state in which positions of the position information items on a map are irregularly arranged in the application example illustrated in FIG. 10A.

FIG. 10B is a diagram which illustrates a state in which positions of the position information items on map 141 in the application example illustrated in FIG. 10A are irregularly arranged.

As illustrated in FIG. FIG. 10B, positions of position information items 141b, 141d, and 141f to 141p are irregularly arranged as with FIG. 8. In addition, since room 110a includes a row or a column which includes a different number of lighting apparatuses 120, it is difficult to correct position information items by corrector 17 on the basis of input information items as with the foregoing embodiment. In view of the above, corrector 17 corrects the position information items using a virtual lighting apparatus. The virtual lighting apparatus shall be described with reference to FIG. 11A and FIG. 11B.

Figure 11A:
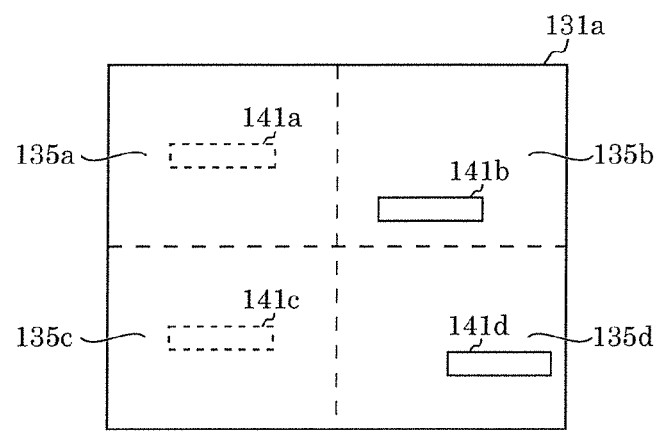
FIG. 11A is an explanation diagram for explaining positions of virtual lighting apparatuses.

FIG. 11A is an explanation diagram for explaining a position of the virtual lighting apparatus. Imaging range 131a of image sensor 130a is illustrated in FIG. 11A. The following describes an operation of corrector 17 according to the other embodiments with reference to FIG. 11A.

Corrector 17 divides imaging range 131a of image sensor 130a into, for example, four division ranges 135a to 135d. For example, corrector 17 divides imaging range 131a into division ranges 135a to 135d each having the same size, such that two divisional ranges are arranged in each of the row direction and the column direction. Next, corrector 17 determines whether or not division ranges 135a to 135d include a range which does not have a position information item. More specifically, since the position information item is based on a position relative to image sensor 130a and is calculated by calculator 13, corrector 17 is capable of determining whether or not a position information item is included in division ranges 135a to 135d. As illustrated in FIG. 11A, since a position information item is not included in division ranges 135a to 135d, corrector 17 determines that a range which does not have a position information item is included in division ranges 135a to 135d. In this case, corrector 17 sets, as surrogates for the position information items, virtual lighting apparatuses 141a and 141c at a center position of each of division ranges 135a and 135c which do not have a position information item. In the same manner as above, corrector 17 determines whether or not division ranges of each of the imaging ranges of image sensors 130b to 130d include a range which does not have a position information item. Corrector 17 sets virtual lighting apparatus 141e, as a surrogate for the position information item, at a center position of the range which does not have a position information item, among the division ranges of image sensor 130b. Here, FIG. 11B illustrates map 141 in which virtual lighting apparatuses 141a, 141c, and 141e are set.

Figure 11B:
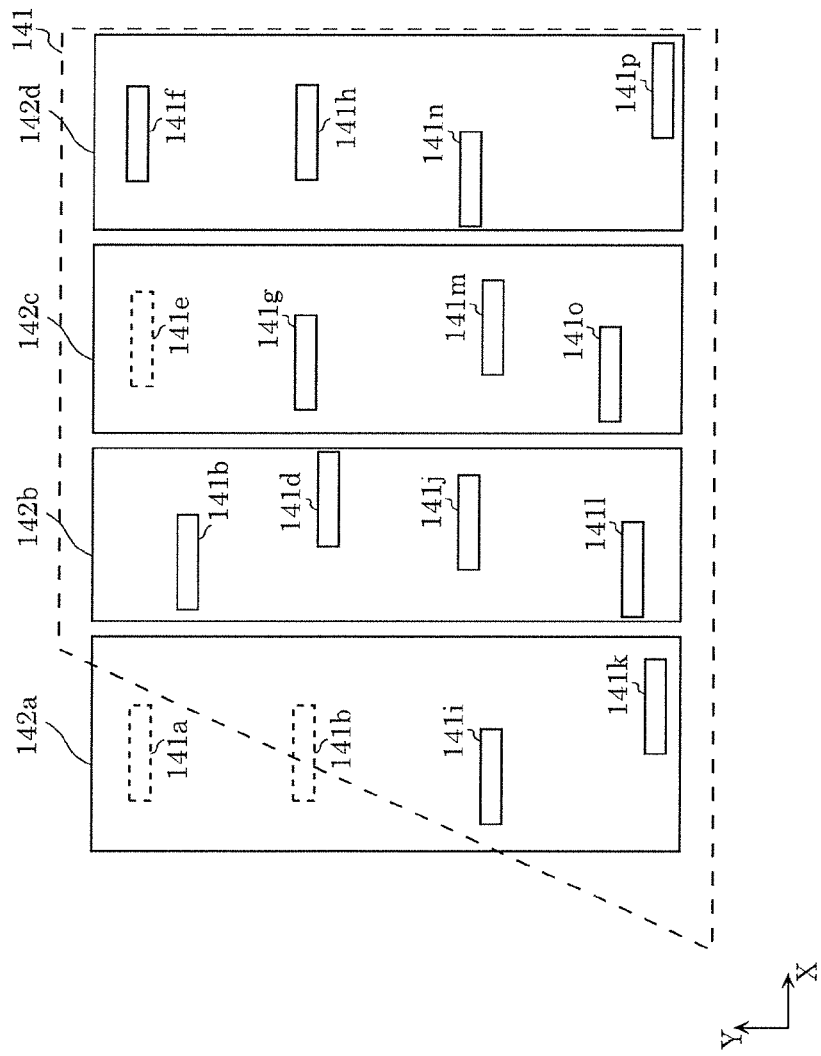
FIG. 11B is a diagram which illustrates a state in which irregularity in positions of the position information items including the position information items of the virtual lighting apparatuses are to be corrected.

FIG. 11B is a diagram which illustrates a state in which irregularity in positions of the position information items including position information items of virtual lighting apparatuses 141a, 141c, and 141e are to be corrected.

It is possible, by setting virtual lighting apparatuses 141a, 141c, and 141e, to presume room 100a to be a room in which a plurality of lighting apparatuses 120 are arranged such that each row includes four lighting apparatuses 120 and each column includes four lighting apparatuses 120. Accordingly, information indicating that the number of lighting apparatuses 120 set to each row and the number of lighting apparatuses 20 set to each column are each four, for example, is provided, making it possible for corrector 17 to correct the positions of position information items. For example, corrector 17 generates a group by selecting, from among the position information items and virtual lighting apparatuses arranged on map 41, four items which are close to the origin (0) in the X-coordinate. Since the X-coordinates of position information items 141i and 141k, and virtual lighting apparatuses 141a and 141b are close to the origin, corrector 17 groups position information items 141i and 141k, and virtual lighting apparatuses 141a and 141b into group 142a. In the same manner as above, corrector 17 generates groups 142b, 142c, and 142d. Then, corrector 17 corrects position information items 141b, 141d, and 141f to 141p and virtual lighting apparatuses 141a, 141c, and 141e to be aligned in respective columns, using the method illustrated in FIG. 9A or FIG. 9B by the same number, such that as many position information items or the virtual lighting apparatuses as indicated by the input information item are installed in each of the columns. In addition, corrector 17 corrects position information items 141b, 141d, and 141f to 141p and virtual lighting apparatuses 141a, 141c, and 141e to be aligned in respective rows, in the same manner as the method of alignment for each column, such that as many position information items or the virtual lighting apparatuses as indicated by the input information item are installed in each of the rows.

Then, after position information items 141b, 141d, and 141f to 141p and virtual lighting apparatuses 141a, 141c, and 141e are aligned, corrector 17 deletes virtual lighting apparatuses 141a, 141c, and 141e.

In this manner, when a range which does not have a position information item is included in a plurality of division ranges resulting from dividing an imaging range of image sensor 130, corrector 17 corrects position information items on the basis of a center position of the range and an input information item.

With this, even when the same number of lighting apparatuses 20 are not installed in each row or in each column, a virtual lighting apparatus is set and irregularity in positions of the position information items is corrected together with the virtual lighting apparatus. In other words, irregularity in positions of the position information items on map 141 is corrected, presuming that the same number of lighting apparatuses 20 are installed in each row and in each column. Accordingly, it is possible to align position information items for each row and for each column even in the case where positions of the position information items are irregularly arranged on map 141 when the same number of lighting apparatuses 20 are not installed in each row or in each column.

It should be noted that corrector 17 may divide an imaging range of image sensor 130 into an arbitrary number of imaging ranges, instead of limiting the number to four. For example, when the number of lighting apparatuses 120 associated with image sensor 130 is three in each of the row direction and the column direction, corrector 17 may divide the imaging range into nine ranges.

In addition, the present disclosure can be implemented not only as the lighting control system, but also as a method including steps (processes) performed by the structural components included in the lighting control system.

For example, these steps may be executed by a computer (computer system). The present disclosure can be implemented as a program for causing the computer to execute the steps included in the method. Furthermore, the present disclosure can be implemented as a non-transitory computer-readable recording medium such as a compact disc read only memory (CD-ROM) on which the program is recorded.

For example, when the present disclosure is implemented by a program (software), each step is performed by executing the program using hardware resources such as a CPU, a memory, an input and output circuit, etc., of the computer. In other words, each of the steps is executed as a result of obtaining and computing data from the memory, the input and output circuit, etc. by the CPU, or outputting a result of the computing to the memory, the input and output circuit, etc. by the CPU, for example.

In addition, each of the structural components included in the lighting control system according to the foregoing embodiments may be implemented as a dedicated or a general-purpose circuit.

In addition, each of the structural components included in the lighting control system according to the foregoing embodiments may be implemented as a large scale integration (LSI) which is an integrated circuit (IC).

Furthermore, the integrated circuit is not limited to the LSI, and may be implemented by a dedicated circuit or a general-purpose processor. A field programmable gate array (FPGA) that is programmable, or a reconfigurable processor that is capable of reconfiguring connection and setting of circuit cells inside an LSI may be used.

Furthermore, when advancement in semiconductor technology or derivatives of other technologies brings forth a circuit integration technology which replaces LSI, it will be appreciated that such a circuit integration technology may be used in circuit integration for each of the structural components included in the lighting control system.

It should be noted that the present disclosure also includes other forms in which various modifications apparent to those skilled in the art are applied to the embodiments or forms in which structural components and functions in the embodiments are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control system, comprising:
   a plurality of lighting apparatuses each having an identification information item that is set in advance;
   a controller;
   at least one image sensor which captures an image of an irradiation surface that is irradiated by the plurality of lighting apparatuses; and
   a display,
   wherein the controller includes:
   a calculator which (i) performs calculation of a position of one of the plurality of lighting apparatuses, on a basis of a luminance level in an image obtained by capturing the image of the irradiation surface by the at least one image sensor in a state in which only the one of the plurality of lighting apparatuses is turned on or off, and (ii) obtains a position of each of the plurality of lighting apparatuses, by performing the calculation for each of the plurality of lighting apparatuses;
   an associator which, every time the calculator performs the calculation of a position of one of the plurality of lighting apparatuses which is turned on or off, associates the identification information item that is set in advance to the one of the plurality of lighting apparatuses, with a position information item indicating the position of the one of the plurality of lighting apparatuses; and
   a generator that generates a map which is to be displayed by the display and in which position information items associated with identification information items by the associator for the plurality of lighting apparatuses are arranged,
   wherein the calculator binarizes the image using a predetermined luminance threshold, and calculates a centroid position of a region having a largest area among regions having either one of: luminance levels greater than or equal to the predetermined luminance threshold; and luminance levels less than or equal to the predetermined luminance threshold, in the image binarized, as the position of the one of the plurality of lighting apparatuses which is turned on or off.

2. The lighting control system according to claim 1,
   wherein the calculator calculates a position at which a luminance level indicates a maximum or minimum value in the image as the position of the one of the plurality of lighting apparatuses which is turned on or off.

3. The lighting control system according to claim 1,
   wherein the at least one image sensor comprises a plurality of image sensors, the lighting control system further comprises an estimator which estimates positional relationship among the plurality of image sensors,
the calculator, further,
   associates the one of the plurality of lighting apparatuses which is turned on or off with one of the plurality of image sensors which has obtained an image including a region having a minimum luminance level or a maximum luminance level among images obtained by capturing images of the irradiation surface by the plurality of image sensors in the state in which the only one of the plurality of lighting apparatuses is turned on or off, and
   calculates, as a position of the one of the lighting apparatuses, a position relative to the one of the plurality of image sensors associated with the one of the lighting apparatuses, and
the generator generates the map in which the position information items associated with the identification information items by the associator are arranged according to the positional relationship estimated by the estimator.

4. The lighting control system according to claim 3,
   wherein the estimator estimates the positional relationship among the plurality of image sensors according to luminance levels in a plurality of images obtained by the plurality of image sensors other than the one of the plurality of image sensors which is associated with the one of the plurality of lighting apparatuses which is turned on or off.

5. The lighting control system according to claim 3,
   wherein the estimator estimates the positional relationship among the plurality of image sensors according to a common portion in the plurality of images obtained by the plurality of image sensors.

6. The lighting control system according to claim 1, further comprising
   a corrector which performs correction on the position information item, on a basis of an input information item indicating, among the plurality of lighting apparatuses which are arranged in rows and columns, a total number of the plurality of lighting apparatuses disposed in a row and a total number of the plurality of lighting apparatuses disposed in a column.

7. The lighting control system according to claim 6,
   wherein, when a plurality of division ranges obtained by dividing an imaging range of the at least one image sensor include a range not having the position information item, the corrector performs the correction on a basis of a center position of the range and the input information item.

8. The lighting control system according to claim 1,
   wherein the at least one image sensor further has a function of at least one of a human sensor and a luminance sensor.

9. A lighting control system, comprising:
   a controller including a processor and a memory storing a program; and
   at least one image sensor which captures an image of an irradiation surface that is irradiated by a plurality of lighting apparatuses,
   wherein the program, when executed by the processor, causes the controller to:
   calculate a position of one of the plurality of lighting apparatuses, by using the image of the irradiation surface captured by the at least one image sensor in a state in which only the one of the plurality of lighting apparatuses is turned on or off, wherein in the calculating, the image is binarized using a predetermined luminance threshold, and a centroid position of a region having a largest area among regions having either one of: luminance levels greater than or equal to the predetermined luminance threshold; and luminance levels less than or equal to the predetermined luminance threshold, in the image binarized, is calculated as the position of the one of the plurality of lighting apparatuses which is turned on or off;

associate identification information item that is set in advance to the one of the plurality of lighting apparatuses with position information item indicating the position of the one of the plurality of lighting apparatuses;

generate a map in which the position information item associated with the identification information item is arranged, and output the map to a display to be displayed on the display.

10. A method, comprising:
(i) calculating a position of one of a plurality of lighting apparatuses, by using an image of an irradiation surface that is irradiated by a plurality of lighting apparatuses in a state in which only the one of the plurality of lighting apparatuses is turned on or off;

(ii) associating identification information item that is set in advance to the one of the plurality of lighting apparatuses with position information item indicating the position of the one of the plurality of lighting apparatuses;

(iii) repeating (i) and (ii) for all of the plurality of lighting apparatuses;

(iv) generating a map in which position information items associated with identification information items for the plurality of lighting apparatuses are arranged, and outputting the map to a display to be displayed on the display, wherein in (i), the image is binarized using a predetermined luminance threshold, and a centroid position of a region having a largest area among regions having either one of: luminance levels greater than or equal to the predetermined luminance threshold; and luminance levels less than or equal to the predetermined luminance threshold, in the image binarized, is calculated as the position of the one of the plurality of lighting apparatuses which is turned on or off.

* * * * *